United States Patent [19]

Telly

[11] Patent Number: 4,515,268

[45] Date of Patent: May 7, 1985

[54] BALL CASE FOR STORING AND ORGANIZING GAGE BALLS

[76] Inventor: Reginald O. Telly, 40002 Tothill, Sterling Hgts., Mich. 48078

[21] Appl. No.: 525,304

[22] Filed: Aug. 22, 1983

[51] Int. Cl.³ .............................................. B65D 85/38
[52] U.S. Cl. .................... 206/305; 206/372; 206/373; 33/168 R; 73/440
[58] Field of Search ............ 206/305, 372, 373, 315.9; 33/168 R; 73/440

[56] References Cited

U.S. PATENT DOCUMENTS

| | | | |
|---|---|---|---|
| 1,157,389 | 10/1915 | Hess | 33/168 R |
| 1,910,930 | 5/1933 | Morris | 206/315.9 |
| 2,348,520 | 5/1944 | Cardwell, Jr. | 73/440 |
| 3,235,062 | 2/1966 | Myers | 206/305 |

Primary Examiner—William T. Dixson, Jr.
Attorney, Agent, or Firm—Remy J. VanOphem

[57] ABSTRACT

A ball case for storing and organizing gage balls of a plurality of predetermined sizes. The ball case has a housing including a base member having at least one and preferably three sloping surfaces. A plurality of partial spherical cavities are formed in the base surface for engagement of the gage balls, the cavities being proportioned appropriately such that a single predetermined horizontal plane above the base member is tangential to each of the gage balls.

23 Claims, 4 Drawing Figures

U.S. Patent  May 7, 1985  4,515,268
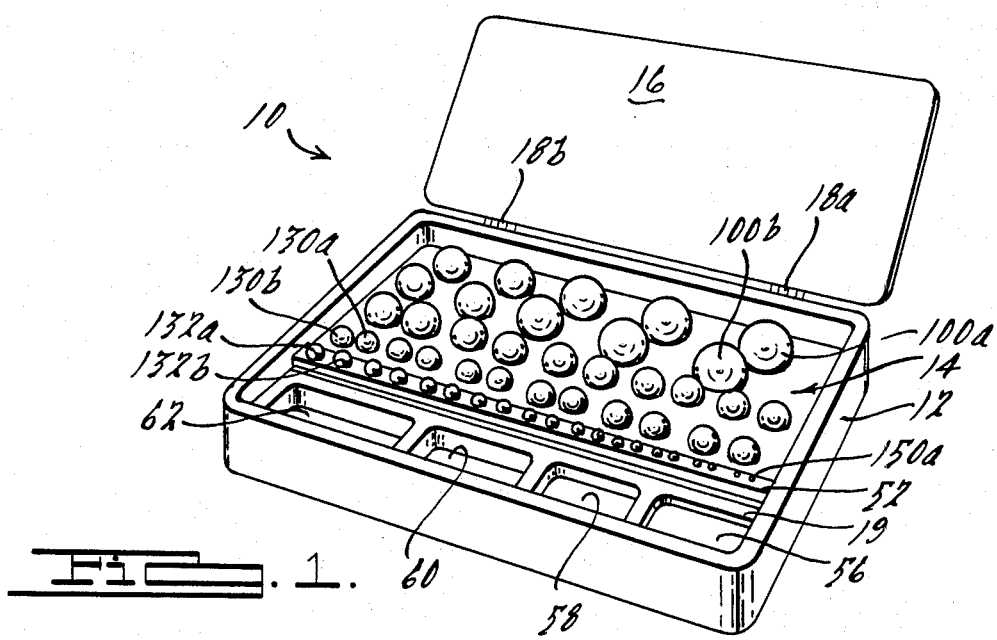
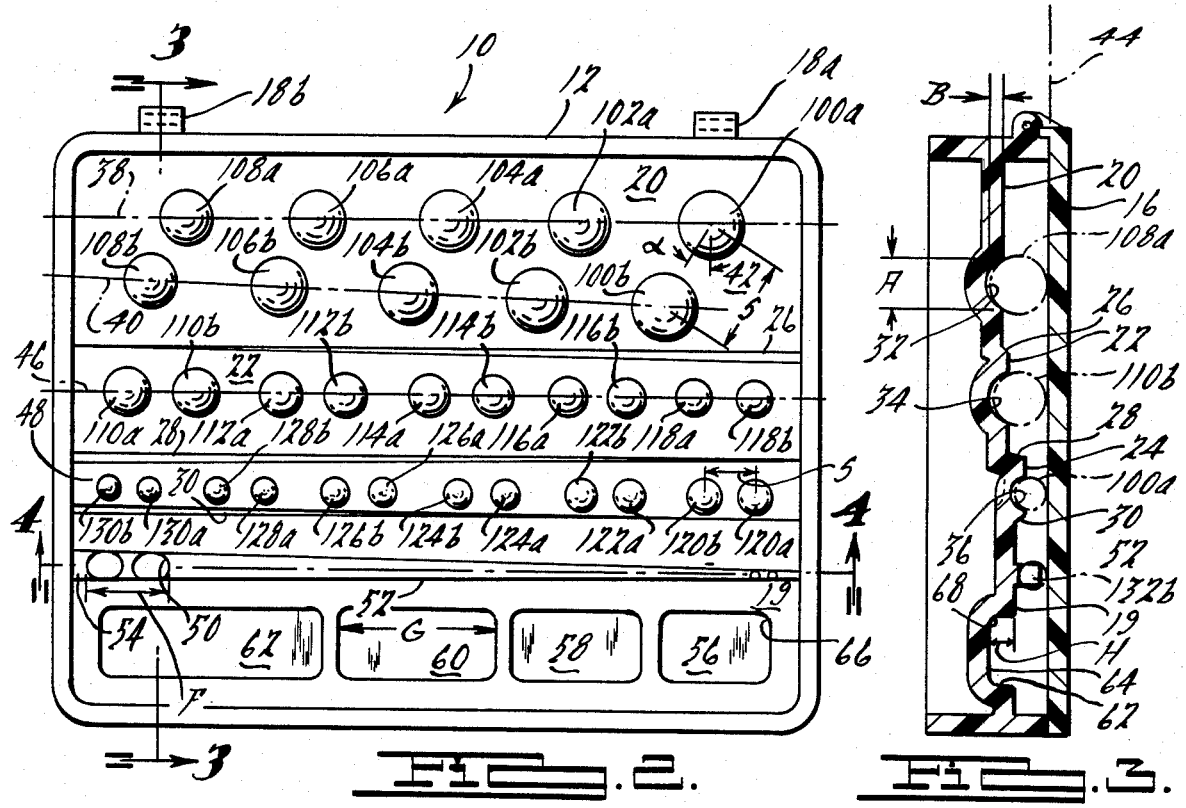

BALL CASE FOR STORING AND ORGANIZING GAGE BALLS

BACKGROUND OF THE INVENTION

The present invention is directed to gage containers and in particular to a ball case for storing and arranging balls of a plurality of predetermined sizes.

Gage balls, usually of stainless steel, are used for a plurality of measuring and gaging functions and are well known in the art. However, usually these gage balls are stored in an unprotected and unarranged manner. Accordingly, it is often difficult to locate the specific size ball which is needed for a particular function and often the balls are damaged so as to not be truly reflective of the desired dimension as a result of the haphazard manner in which they are stored.

What is needed, therefore, is a systematic way of storing and organizing gage balls.

SUMMARY OF THE PRESENT INVENTION

The present invention is directed to the problem of providing a convenient ball case for storing and organizing gage balls.

The ball case of the present invention includes a housing and a base member for the housing including at least one and preferably three sloping surfaces. A plurality of partial spherical cavities are formed in the base member below the sloping surfaces so as to create compartments for engaging the lower portion of gage balls so that the balls may be organized in an appropriate array. The cavities are formed of a predetermined depth so that, when all the balls are stored in their proper locations, the top surfaces of the balls together define a single predetermined horizontal plane. Furthermore, less than one fourth of the volume of each ball is preferably disposed in its appropriate cavity so that the balls may be easily removed from the ball case.

Accordingly, it is the principal object of the present invention to provide a novel and convenient ball case for storing and organizing gage balls.

It is a further object of the present invention to provide a method for storing and organizing gage balls wherein the gage balls are easy to locate and remove from the ball case. This object is accomplished by providing a common upper surface for all of the gage balls and further by having most of the volume of the gage balls extending above the base member of the housing.

A still further object of the present invention is to provide a ball case which will keep the gage balls in an organized and stored condition even when the case is turned upside down or otherwise abused. This is achieved by providing a common upper planar surface for all of the gage balls, when properly stored, so that the lower surface of a cover fastened to the housing will trap each of the gage balls in position.

Yet another object of the present invention is to provide a ball case permitting rapid location of a gage ball of a predetermined size. This is accomplished in the present invention by providing an organized array of gage balls, preferably organized in pairs, and distributed in a serpentine array of gage balls of generally increasing size extending from one front corner of the ball case to one rear corner of the ball case. Furthermore, the base member may be provided with indicia adjacent each gage ball indicating the size of the gage ball to further facilitate locating a desired gage ball.

Still another object of the present invention is to provide a ball case for storing and organizing gage balls, wherein additional or extra gage balls in addition to those which were originally provided with the ball case may be stored together therewith. The present invention accomplishes this object by providing a plurality of additional rectangular cavities for storing extra, assorted sized gage balls.

These and many other objects, features, and advantages of the present invention will become apparent to those skilled in the art when the following detailed description of the preferred embodiment is read in conjunction with the drawings which are appended hereto.

BRIEF DESCRIPTION OF THE DRAWINGS

In the attached drawings, wherein like reference numerals refer to like components throughout:

FIG. 1 is a three quarter perspective view of a ball case according to the present invention, and gage balls stored in the ball case;

FIG. 2 is a top view of the ball case of FIG. 1 with the cover removed; and

FIGS. 3 and 4 are sectional views of the ball case of FIGS. 1 and 2 taken, respectively, along lines 3—3 and 4—4 thereof.

DETAILED DESCRIPTION OF THE PREFERRED EMBODIMENT

Referring now to the drawing and more particularly to FIGS. 1 and 2 thereof, the present invention is directed to providing a ball case 10 for storage of a plurality of gage balls 100a and 100b through 150a and 150b, which are described later in detail. The ball case 10 is provided with a side wall 12 defining a rectangular enclosure. A base member 14, also described later in detail, is interconnected with the side wall 12 or, as shown in the drawing in FIG. 3, is formed integrally therewith. A flat cover 16 is hingedly interconnected by way of hinges 18a and 18b, with the rear portion of the side wall 12 so as to form, when closed, a gage ball storage compartment between the flat cover 16 and the base member 14 and generally surrounded by the side wall 12.

Referring now to FIGS. 2 and 3, the base member 14 generally consists of a unitary plastic molding having a front horizontal surface 19 and three sloping surfaces 20, 22, and 24. The intermediate surfaces 26, 28 and 30 provide a transition between the various surfaces 19, 20, 22, and 24, as shown in the drawing.

The rearward most or first sloping surface 20 slopes downwardly, as viewed in FIG. 2, from the left side of the ball case 10 to the right side thereof. The first sloping surface 20 forms a first predetermined angle relative to the horizontal. The intermediate or second sloping surface 22 slopes downwardly in the opposite direction from the first mentioned sloping surface 20. That is, as viewed in FIG. 2, the second sloping surface 22 slopes downwardly from the right side of the drawing to the left side. The second sloping surface 22 thereby forms a second predetermined angle relative to the horizontal and a third predetermined angle relative to the first sloping surface. The forward most or third sloping surface 24 slopes downwardly in the same direction as the first sloping surface 20 and, accordingly, forms a fourth predetermined angle relative to the horizontal and a fifth predetermined angle relative to the second sloping surface 22. The front surface 19, however, is preferably generally horizontally disposed.

A plurality of partial spherical cavities are provided in the base member 14 extending downwardly from each of the sloping surfaces 20, 22, and 24. Three typical partial spherical cavities 32, 34, and 36, are depicted in FIG. 3. Each of the plurality of partial spherical cavities are of a predetermined size so as to engage a predetermined sized gage ball 100a and 100b through 130a and 130b. The partial spherical cavities are arranged so as to form an array of cavities generally increasing in size along a serpentine path described below.

The largest cavities, intended to hold the largest of the gage balls, are provided in the rearward most sloping surface 20. The cavities in the first sloping surface 20 are each provided along one of two approximately parallel or converging lines 38 and 40. Along each of the lines 38 and 40 are disposed a series of partial spherical cavities or apertures 32 (FIG. 3) which, as viewed in FIG. 2, are decreasing in size from the right side of the ball case 10 to the left side. However, since it is desirable to store two gage balls of similar size for various purposes, the line 40 contains apertures of the same sizes as those along the line 38. The similarly sized apertures in the line 40 are staggered by an angle alpha, preferably thirty degrees (30°), relative to the identical cavity in the line 38. Accordingly, as illustrated in the drawing, two similarly sized gage balls 100a and 100b may be provided, one in the first cavity in each of the lines 38 and 40. Similarly, two similarly sized gage balls 102a and 102b may be provided in the second cavities of the lines 38 and 40, respectively. Indicia indicating the size of the gage balls may be provided, for example, at 42 so as to readily identify the size of the gage ball stored in a particular aperture 32.

It may readily be appreciated that by appropriate selection of the first predetermined angle as well as by appropriate selection of the dimensions of the partial spherical cavities 32, the gage balls 100a and 100b through 108a and 108b may be arranged in an array wherein the upper surfaces of each of these gage balls are located so as to define a common predetermined imaginary horizontal surface 44, as shown in FIG. 3, tangential to each of the gage balls 100a and 100b through 108a and 108b.

Similarly, a series of cavities 34 smaller than the cavities formed in the first sloping surface 20 are formed in the second sloping surface 22 along a line 46. The line 46 is generally parallel to a theoretical line intermediate the lines 38 and 40. The cavities 34 formed in the second sloping surface 22 generally decrease in size, as viewed in FIG. 2, from the left side of the ball case 10 towards the right side thereof, except that the cavities are arranged in pairs such that the first two cavities 34 engage a first pair of identically sized gage balls 110a and 110b while the next two cavities 34 engage a second pair of identically sized gage balls 112a and 112b which are smaller than the first pair of gage balls 110a and 110b. Accordingly, a series of intermediate sized gage balls, 110a and 110b through 118a and 118b are engageable with the cavities 34, these intermediate sized gage balls all being smaller than the gage balls 100a and 100b through 108a and 108b arranged on the first mentioned sloping surface 20.

By appropriate selection of predetermined dimensions of the second predetermined angle and of the cavities 34, the gage balls 110a and 110b through 118a and 118b may be arranged so as to each be tangential to the surface 44 defined above.

A similar array of smaller partial spherical cavities 36 are disposed along the third sloping surface 24 along a line 48 generally parallel to the above mentioned line 46. The partial spherical cavities 36 are dimensioned so as to permit the engagement of a plurality of pairs of small gage balls 120a and 120b through 130a and 130b in a generally descending series extending from the right side of the ball case 10 towards the left side thereof.

Each of the gage balls 120a and 120b through 130a and 130b are smaller than the previously mentioned gage balls 100a and 100b through 118a and 118b and, as described above, are tangential with the surface 44.

It has been experimentally determined that the highly satisfactory ball case according to the present invention is provided when designed according to the following chart:

CHART I

| Reference Numeral | "D" | "A" | "B" | "C" | "S" |
|---|---|---|---|---|---|
| 100a and 100b | 1.0000 | .866 | .281 | .474 | 1.25 |
| 102a and 102b | .9375 | .812 | .266 | .443 | 1.12 |
| 104a and 104b | .8750 | .758 | .250 | .412 | 1.06 |
| 106a and 106b | .8125 | .704 | .234 | .381 | 1.00 |
| 108a and 108b | .7500 | .650 | .219 | .350 | .94 |
| 110a and 110b | .7187 | .622 | .211 | .335 | .9 |
| 112a and 112b | .6875 | .595 | .203 | .320 | .87 |
| 114a and 114b | .6562 | .568 | .195 | .304 | .84 |
| 116a and 116b | .6250 | .541 | .187 | .289 | .82 |
| 118a and 118b | .5937 | .514 | .180 | .274 | .80 |
| 120a and 120b | .5625 | .487 | .172 | .259 | .72 |
| 122a and 122b | .5312 | .460 | .164 | .243 | .67 |
| 124a and 124b | .5000 | .433 | .156 | .228 | .63 |
| 126a and 126b | .4687 | .406 | .148 | .213 | .60 |
| 128a and 128b | .4375 | .389 | .141 | .198 | .57 |
| 130a and 130b | .4062 | .352 | .133 | .183 | .54 |

In the above chart, "D" is the diameter of the gage ball to be stored. "A" is the maximum diameter of the cavity for the gage ball, as indicated in FIG. 3. "B" is the depth of the cavity, as indicated in FIG. 3, "C" is the spherical radius of curvature of the cavity. "S" is the spacing between the centers of identical cavities, as indicated in FIG. 2. It may be readily appreciated that the first, second and fourth predetermined angles for the sloping surfaces 20, 22 and 24 are automatically determined by these dimensions and are not as critical as these dimensions. This is true since the dimensions in this chart, together with the surface 44 which provides a reference surface, define the sloping surfaces 20, 22 and 24.

It should also be noted that the dimensions "A", "B" and "C" are median dimensions which may be varied slightly between the pairs of cavities having identical gage balls due to the amount of slope between these cavities. However, in practice, it has been determined that this variation results in a negligible amount of difference in height between adjacent identical spherical balls and, accordingly, the dimensions given may be, in fact, used for both cavities.

In addition to the partial spherical cavities 32, 34 and 36 for various sized gage balls, an additional provision is made in accordance with the present invention for extremely small gage balls 132a and 132b through 150a and 150b. The smallest gage balls are inserted in cylindrical cavities 50 formed in an elongated ridge 52 extending upwardly from the front horizontal surface 19 of the base member 14 and having an axis of elongation 54 disposed parallel to the lines 46 and 48.

In the preferred embodiment, the elongated ridge 52 is tapered such as to be narrower towards the right side of the ball case 10, as viewed in FIG. 2, than on the left side thereof. The cylindrical cavities 50 preferably exceed the width of the elongated ridge 52 so as to facilitate removal of the gage balls from the cylindrical cavities. The depths of each of the cavities 50 are predetermined so as to elevate the gage balls 132a and 132b through 144a and 144b so as to be tangential with the imaginary surface 44. However, for the extremely small spherical balls 146a and 146b through 150a and 150b, the cylindrical cavities 50 are preferably of a sufficient depth so that two identical tiny gage balls may be stored in each cavity, as illustrated in FIG. 4.

It has been determined experimentally that an elongated ridge 52 designed according to the criteria in the following chart provides a satisfactory storage means for extremely small gage balls.

CHART II

| Reference Numeral | "D" | "E" | "F" | "S" |
|---|---|---|---|---|
| 132a and 132b | .3750 | .176 | .405 | .60 |
| 134a and 134b | .3437 | .160 | .374 | .55 |
| 136a and 136b | .3125 | .145 | .343 | .51 |
| 138a and 138b | .2872 | .130 | .311 | .48 |
| 140a and 140b | .2500 | .114 | .290 | .44 |
| 142a and 142b | .2187 | .099 | .249 | .38 |
| 144a and 144b | .1875 | .084 | .218 | .33 |
| 146a and 146b | .1562 | .069 | .186 | — |
| 148a and 148b | .1406 | .062 | .171 | — |
| 150a and 150b | .1250 | .055 | .155 | — |

In the above chart, it is assumed that the cavities 50 are oval in cross-section, rather than circular. "D" represents the diameter of the gage balls 132a and 132b through 150a and 150b. "E" represents the radius of curvature of the sides of the cavities 50. "F" represents the total maximum width of the cavity, as shown in FIG. 2. "S" again represents the spacing between identical gage balls.

It may readily be appreciated that the flat cover 16 of the ball case 10 preferably rests directly against, or a predetermined short distance above, the imaginary surface 44 so that when the flat cover 16 is closed it traps the gage balls 100a and 100b through 150a and 150b in their respective cavities 32, 34, 36 and 50. Accordingly, the ball case 10 of the present invention provides a convenient and reliable way of storing and organizing the gage balls and prevents the inadvertent loss of the gage balls. Furthermore, the gage balls remain in their predetermined locations so that the size of the gage ball may be readily determined. Finally, the common top tangential surface defined by the gage balls assists the user in rapidly determining when a gage ball has been misplaced.

It should be noted that the present invention further provides a ball case wherein the gage balls are easily removable from the case when needed. From the dimensions given on Chart I, it will be appreciated that less than one fourth of the total volume of the balls 100a and 100b through 130a and 130b are inserted into the cavity. Accordingly, the user can easily remove the desired gage ball from its predetermined cavity without disrupting the remaining balls. Similarly, the dimensions of the cylindrical cavities 50, given by Chart II above, result in a portion of the gage balls 132a and 132b and 150a through 150b protruding from the elongated ridge 52 so that, again, they may be easily removed from the elongated ridge.

Referring again to FIGS. 1 through 3, the ball case 10 of the present invention preferably also includes a plurality of rectangular cavities 56, 58, 60, and 62 formed in the forward most portion of the front horizontal surface 19. These cavities are provided for the storage of miscellaneous items, and particularly, for the storage of miscellaneous, or odd sized gage balls. In the preferred embodiment, each of the rectangular cavities 56 through 62 are provided with a horizontal lower surface 64 spaced a predetermined distance below the front horizontal surface 19. As illustrated in FIG. 2, the depth, as well as the length, of the rectangular cavities 56 through 62 increases from the right side of the ball case 10 to the left side thereof.

It has been determined by the Applicant that a satisfactory array of rectangular cavities 56 through 62 are provided using dimensions in the chart below.

CHART III

| Reference Numeral | "G" Width | "H" Depth | "J" Corners |
|---|---|---|---|
| 62 | 3.00 | .81 | .25 |
| 60 | 2.12 | .75 | .18 |
| 58 | 1.75 | .69 | .15 |
| 56 | 1.5 | .56 | .12 |

In the above chart, the letter "G" represents the width of the rectangular cavity, as indicated in FIG. 2. "H" represents the depth of the cavity as indicated in FIG. 3. "J" represents the radius of curvature of the angles of the corners 66 and 68 of the rectangular cavities.

Accordingly, the rectangular cavities 56 through 62 provide for means for storing various odd sized or additional gage balls as well as other miscellaneous items. The rectangular cavities are of different sizes so that the items stored therein may be selectively placed in an appropriately sized cavity and will be restrained against a substantial amount of movement when the flat cover 16 is closed.

It may be readily appreciated that the above description is given by way of example and not by way of limitation. Various modifications may be made to the structure described above within the scope of the present invention which is intended to be limited only by the scope of the claims appended hereto. For example, the gage balls may have exclusively metric measurements or, alternatively, may be of both metric and English sizes.

What is claimed as novel is as follows:

1. A ball case for storing and organizing gage balls of a plurality of predetermined sizes, said ball case comprising:
    a housing;
    a base member for said housing, said base member having an upper surface including at least a first sloping surface; and
    a plurality of partial spherical cavities formed in said base member below said first sloping surface, each of said cavities having predetermined portions for engaging one of said gage balls and predetermined depths such that said gage balls, when engaged in their respective cavities, extend upwardly therefrom to together define a single predetermined horizontal planar surface thereabove tangential to each of said gage balls.

2. The ball case of claim 1 wherein said cavities are proportioned such that substantially less than half of the volume of each of said gage balls extends below said first sloping surface.

3. The ball case of claim 2 wherein said cavities are proportioned such that substantially less than one fourth of the volume of each of said gage balls extends below said first sloping surface.

4. The ball case of claim 1 wherein said base member further comprises at least a second sloping surface forming a first predetermined non-zero angle relative to said first sloping surface, and another plurality of said partial spherical cavities formed in said base member below said second sloping surface.

5. The ball case of claim 4 wherein the portion of said cavities formed in said first sloping surface are generally disposed in a first linear array and further wherein said cavities formed in said second sloping surface are generally disposed in a second linear array generally parallel to said first linear array.

6. The ball case of claim 4 wherein said base member further comprises at least a third sloping surface forming a second predetermined non-zero angle relative to said first sloping surface and a third predetermined non-zero angle relative to said second sloping surface, such that a portion of said cavities formed in said base member are formed below each of said first, second and third sloping surfaces.

7. The ball case of claim 4 wherein said first sloping surface generally slopes from one side of said base member to the other side of said base member while said second sloping surface slopes downwardly from said other side towards said one side.

8. The ball case of claim 1 further comprising:
an elongated member interconnected with said base member with its axis of elongation disposed horizontally; and
a plurality of at least partially cylindrical vertical cavities formed in an upper portion of said elongated member, each of said at least partially cylindrical cavities having a predetermined diameter for engagement of one of said gage balls and a predetermined depth such that the upper portion of said gage balls is tangential to said single predetermined horizontal planar surface.

9. The ball case of claim 8 further comprising at least one vertical cylindrical cavity formed in said upper surface of said elongated member having a diameter suitable for engagement of either of two identical gage balls and a predetermined depth such that both of said two identical gage balls may be inserted therein with the upper portion of the upper one of said two identical gage balls being tangential with said single predetermined horizontal planar surface.

10. The ball case of claim 1 further comprising at least one rectangular cavity in said base member for miscellaneous storage.

11. The ball case of claim 10 further comprising a plurality of rectangular cavities in said base member for miscellaneous storage, said rectangular cavities being generally disposed in a linear array from a first rectangular cavity to a final rectangular cavity such that each of said cavities has a predetermined depth greater than the preceding rectangular cavity.

12. The ball case of claim 1 further comprising a flat cover for said housing, said flat cover forming a horizontal surface parallel to said predetermined horizontal planar surface when said flat cover is closed.

13. The ball case of claim 1 wherein there are two gage balls of each of said predetermined sizes, said gage balls being arranged in said housing such that said gage balls of identical size are disposed adjacent each other.

14. The ball case of claim 1 further comprising indicia on said base member indicating the sizes of said gage balls.

15. A ball case for storing and organizing gage balls of a plurality of sizes, such that there are generally two gage balls of each of said sizes and such that said gage balls are generally grouped into at least a first size range and at least a second size range, said ball case comprising:
a housing;
a base member for said housing;
a first sloping surface formed in said base member, said first sloping surface forming a first predetermined non-zero angle relative to the horizontal;
a first plurality of partial spherical cavities in said base member below said first sloping surface, each of said cavities having predetermined proportions for engaging one of said gage balls in said first size range;
a second sloping surface formed in said base member, said second sloping surface forming a second predetermined non-zero angle relative to the horizontal and a third predetermined non-zero angle relative to said first sloping surface; and
a second plurality of partial spherical cavities in said base member below said second sloping surface, each of said cavities having predetermined proportions for engaging one of said gage balls in said second size range;
each of said first and second plurality of cavities having appropriate predetermined depths such that all of said gage balls, when engaged in their respective cavities, extend upwardly therefrom to together define a single predetermined horizontal planar surface tangential to each of said gage balls.

16. The ball case of claim 15 wherein said cavities are proportioned such that substantially less than one fourth of the volume of each of said gage balls extends below said first sloping surface.

17. The ball case of claim 15 wherein the portion of said cavities formed in said first sloping surface are generally disposed in a first linear array and further wherein said cavities formed in said second sloping surface are generally disposed in a second linear array generally parallel to said first linear array.

18. The ball case of claim 15 further comprising:
an elongated member interconnected with said base member with its axis of elongation disposed horizontally; and
a plurality of at least partially cylindrical vertical cavities formed in the upper portion of said elongated member, each of said at least partially cylindrical vertical cavities having a predetermined diameter for engagement of one of said gage balls and a predetermined depth such that the upper portion of said one gage ball is disposed tangential said single predetermined horizontal planar surface.

19. The ball case of claim 15 further comprising a plurality of rectangular cavities in said base member for miscellaneous storage, said rectangular cavities being generally disposed in a linear array from a first rectangular cavity to a final rectangular cavity such that each of said cavities has a predetermined depth greater than the preceding rectangular cavity.

20. A ball case for storing and organizing gage balls of a plurality of sizes such that there are two gage balls of each of said predetermined sizes and such that said gage balls are generally grouped into at least three distinct size ranges comprising a plurality of pairs of identically sized small gage balls, a plurality of pairs of identically sized intermediate gage balls, and a plurality of pairs of identically sized large gage balls, said ball case comprising:

a housing having a front portion and a rear portion;

a base member for said housing;

a first elongated sloping surface formed in said base member towards the front of said housing, said first sloping surface forming a first predetermined angle relative to the horizontal such that said surface generally slopes downwardly from one side of said base member towards the other side of said base member;

a first plurality of partial spherical cavities formed in said base member below said first sloping surface, said first plurality of partial spherical cavities generally being arranged in a linear array extending from said one side towards said other side of said base member, each of said partial spherical cavities having predetermined proportions for engaging one of said small gage balls such that each pair of identically sized small gage balls are disposed adjacent each other and such that said small gage balls, when distributed in said partial spherical cavities form a linear array of gage balls of generally increasing size extending from said one side of said base member towards said other side of said base member;

a second elongated sloping surface formed in said base member rearward of said first elongated sloping surface, said second sloping surface forming a second predetermined angle relative to the horizontal and a third predetermined angle relative to said first sloping surface such that said surface generally slopes downwardly from said other side of said base member towards said one side of said base member;

a second plurality of partial spherical cavities formed in said base member below said second sloping surface, said second plurality of partial spherical cavities being generally arranged in a second linear array parallel to said first linear array and extending from said other side of said base member towards said one side thereof, each of said partial spherical cavities having predetermined proportions for engaging one of said intermediate gage balls such that each pair of identically sized intermediate gage balls are disposed adjacent each other and such that said intermediate gage balls, when engaged in their associated spherical cavities, form a linear array of gage balls of generally increasing size from said other side of said base member towards said one side thereof;

a third elongated sloping surface formed in said base member towards the rear portion of said housing, said third sloping surface forming a fourth predetermined angle relative to the horizontal and a fifth predetermined angle relative to said second sloping surface such that said third sloping surface generally slopes downwardly from said one side of said base member towards the other side thereof;

a third plurality of partial spherical cavities formed in said base member below said third sloping surface, said third plurality of partial spherical cavities generally being arranged in a linear array extending from said one side towards said other side of said base member, each of said partial spherical cavities having predetermined proportions for engaging one of said large gage balls such that only one of each pair of identically sized large gage balls are disposed in said third linear array, said large gage balls being generally arranged so as to be increasing in size from said one end towards said other end of said base member; and a fourth plurality of partial spherical cavities formed in said base member below said third sloping surface, said fourth plurality of partial spherical cavities generally being arranged in a fourth linear array parallel to said third linear array and spaced rearwardly thereof, each of said partial spherical cavities of said fourth linear array having predetermined proportions for engaging the other one of said pairs of large gage balls such that each pair of identically sized large gage balls are disposed adjacent each other;

such that each of said cavities of said first, second, third and fourth linear arrays have a predetermined depth such that the top surfaces of each of said gage balls together define a single predetermined horizontal planar surface tangential to each of said gage balls and further such that less than one fourth of the total volume of each of said gage balls extends above said sloping surfaces.

21. The ball case of claim 20 further comprising:

an elongated member interconnected with said base member with its axis of elongation disposed horizontally; and a plurality of at least partially cylindrical vertical cavities formed in the upper portion of said elongated member, each of said at least partially cylindrical cavities having a predetermined diameter for engagement of one of said gage balls and a predetermined depth such that the upper portion of said one gage ball is disposed tangential with said single predetermined horizontal planar surface.

22. The ball case of claim 20 further comprising a plurality of rectangular cavities in said base member for miscellaneous storage, said rectangular cavities being generally disposed in a linear array from a first rectangular cavity to a final rectangular cavity such that each of said cavities has a predetermined depth greater than the proceding rectangular cavity.

23. The ball case of claim 20 further comprising indicia on said base member indicating the sizes of said gage balls.

* * * * *